United States Patent [19]
Mead et al.

[11] Patent Number: 5,555,035
[45] Date of Patent: Sep. 10, 1996

[54] VERY HIGH RESOLUTION LIGHT VALVE WRITING SYSTEM BASED ON TILTING LOWER RESOLUTION FLAT PANELS

[75] Inventors: Donald C. Mead, Carlsbad; Ronald S. Gold, Fullerton; Victor J. Fritz, Chino Hills, all of Calif.

[73] Assignee: Hughes Aircraft Company, Los Angeles, Calif.

[21] Appl. No.: 316,782

[22] Filed: Oct. 3, 1994

[51] Int. Cl.$^6$ .............................. H04N 5/74; H04N 9/31
[52] U.S. Cl. ..................... 348/757; 348/383; 348/751; 353/31; 353/34; 353/82
[58] Field of Search .................................. 348/383, 744, 348/750, 751, 752, 756, 757, 758, 778, 779, 780; 353/30, 31, 32, 33, 34, 37, 82; H04N 5/74, 9/31

[56] References Cited

U.S. PATENT DOCUMENTS

| | | | |
|---|---|---|---|
| 4,734,779 | 3/1988 | Levis et al. | 353/30 X |
| 4,906,071 | 3/1990 | Takahara et al. | 353/31 X |
| 5,260,815 | 11/1993 | Takizawa | 348/751 X |
| 5,327,270 | 7/1994 | Miyatake | 353/31 X |
| 5,357,289 | 10/1994 | Konno et al. | 348/757 |
| 5,404,175 | 4/1995 | Nagae et al. | 348/751 |

*Primary Examiner*—Victor R. Kostak
*Assistant Examiner*—John W. Miller
*Attorney, Agent, or Firm*—G. S. Grunebach; M. W. Sales; W. K. Denson-Low

[57] ABSTRACT

Projection apparatus comprising high resolution projection display systems that generate a relatively large high resolution image on a display screen, wherein seams and tiling artifacts in observation (image) space are eliminated or minimized. The projection apparatus comprises an image source that includes a plurality of small tiled image displays, relay optics, and a photoactivated reflective liquid crystal light valve. The small tiled or mosaic-like displays that provide source images that are displayed. The images projected by the image displays are imaged onto the light valve. A polarizing beamsplitter is disposed adjacent an output surface of the light valve, and an illumination source provides illumination light that is projected by way of the polarizing beamsplitter onto an output surface of the light valve. The illumination light is reflected from the output surface of the light valve back through the polarizing beamsplitter. A projection lens projects the illumination light onto the display screen. When the tiles are aligned so that the seams are a small fraction of a pixel, the light valve spatially low pass filters the tiled image, thereby eliminating the seams, and minimizing any tiling artifacts in the displayed image. A partially reflecting and transmitting beamsplitter may be disposed between the plurality of tiled image displays and the relay optics. This beamsplitter may be a thin glass plate, a thin quartz plate, or a pellicle. The plurality of tiled image displays may comprise flat panel displays or active matrix light valves. The relay optics may comprises a plurality of relay lenses or a single relay lens. The projection light may be continuous or sequentially imaged monochrome or red-green-blue (RGB) light provided by the illumination source.

29 Claims, 3 Drawing Sheets

PROJECTION ILLUMINATION LIGHT (CONTINUIOUS OR SEQUENTIAL)

PROJECTION LIGHT SOURCE

PROJECTION ILLUMINATION LIGHT (CONTINUIOUS OR SEQUENTIAL)

PROJECTION LIGHT SOURCE

VERY HIGH RESOLUTION LIGHT VALVE WRITING SYSTEM BASED ON TILTING LOWER RESOLUTION FLAT PANELS

BACKGROUND

The present invention relates to image display systems, and more particularly, to image display systems for displaying relatively large high resolution images that use small tiled or mosaic-like displays.

Tiling small displays to form larger displays having a relatively large number of pixels has been an objective of large-size display development for a number of years. All attempts to develop such large high resolution displays using observation (image) space have failed. Regardless of how small the seams or the zone or area between tiles have been made, they have been observable and objectionable to viewers. Due to vernier acuity and intensity variation sensitivity of the human vision system, this is not too surprising.

Prior art includes conventional tiling approaches, including direct view CRT mosaic-like displays (i.e. stacked monitors), for example, commonly known as a video wall. This approach has significant disadvantages including severe and large opaque borders or "seams" between the constituent displays that make up the image.

Another approach includes direct projection of smaller cathode ray tube (CRT) images. This approach tends to produce considerable light fall-off and nonuniformity between the tiles of the tiled displays, and requires a relatively complex feathering scheme or intensity matching between the tiles of the tiled displays at the edges of the individual images.

Additionally, there is a direct view tiled flat panel display, known as the French Matra Grand X display. This display shows considerable intensity variation between the tiles that make up the complete display. Also, there is a noticeable demarcation between the tiles, although it is considerably less than the conventional stacked CRT video wall approach. The tiled flat panel display may be made relatively large (up to 36 square meters in size), but with the significant drawbacks and limitations described above.

The closest prior art, comprising a smaller CRT projection system, has the disadvantages mentioned above, as well as a limited light output, unless an unreasonably large number of CRTs are used (especially when considering color), due to the fact that the illumination source and the object source are one and the same.

It is therefore an objective of the present invention to provide for projection display systems that project relatively large high resolution images using small tiled or mosaic-like displays and that overcome the limitations of conventional display systems.

SUMMARY OF THE INVENTION

In order to meet the above and other objectives, the present invention provides for projection apparatus comprising high resolution projection display systems that generate a relatively large high resolution image on a display screen. The present projection apparatus uses a plurality of small tiled or mosaic-like displays that generate source images for the large image produced by the high resolution display system.

The projection apparatus comprises an image source that includes a plurality of relatively small tiled or mosaic-like image displays, relay optics, and a photoactivated reflective liquid crystal light valve. Images projected by the plurality of image displays are imaged onto an input surface of the photoactivated reflective liquid crystal light valve.

A polarizing beamsplitter is disposed adjacent an output surface of the photoactivated reflective liquid crystal light valve. An illumination source is disposed adjacent the polarizing beamsplitter that provides projection illumination light that is projected by way of the polarizing beamsplitter onto the output surface of the photoactivated reflective liquid crystal light valve. The projected light is reflected from the output surface of the photoactivated reflective liquid crystal light valve back through the polarizing beamsplitter. A projection lens is disposed adjacent an output surface of the polarizing beamsplitter and projects a high resolution image onto the display screen.

The projection may further comprise a beamsplitter disposed between the plurality of tiled image displays and the relay optics. The beamsplitter comprises a partially reflecting and transmitting beamsplitter plate that may be a thin glass plate, a thin quartz plate, or a pellicle, for example.

The plurality of tiled image displays may comprise flat panel displays or active matrix liquid crystal light valves, or self-emissive displays. The relay optics may comprise a plurality of relay lenses or a single relay lens. The projection light may be continuous or sequentially imaged monochrome or red-green-blue (RGB) light provided by the illumination source.

The present invention uses optically tiling of image sources in object space that are written onto a photoactivated reflective liquid crystal light valve. When the tiles are aligned so that the seams are a small fraction of a pixel, the photoactivated reflective liquid crystal light valve, to a high degree, spatially low pass filters the tiled image, thereby eliminating the seams, and minimizing any filing artifacts in observation (image) space.

The concepts of the present invention provide for the manufacture of very high resolution ($\geq 8$ million pixel) displays using available manufacturable components, at an affordable cost. To have an acceptable display, nearly all of the pixels must be perfect. For very large, high resolution displays, this is nearly impossible to achieve at a reasonable cost and in any significant quantities. However, high quality matrix displays on the order of 1024×1280 pixels are are currently under development, and may be employed in the present systems to produce large high resolution image displays.

The present display systems provide for relatively large displayed images having relatively high resolution, at relatively high luminance levels, than are conventionally achievable. The present display systems also minimize any visible contrast variations and luminance fall-off effects in the projected and observed image.

The present display systems may be used for high resolution digital or electronic cinema projection systems, and may also be used as a replacement for CRTs currently used as image sources for digital or electronic cinema applications. This provides for smaller packaging and higher performance at a lower cost. The present invention may be used in training and simulation applications.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
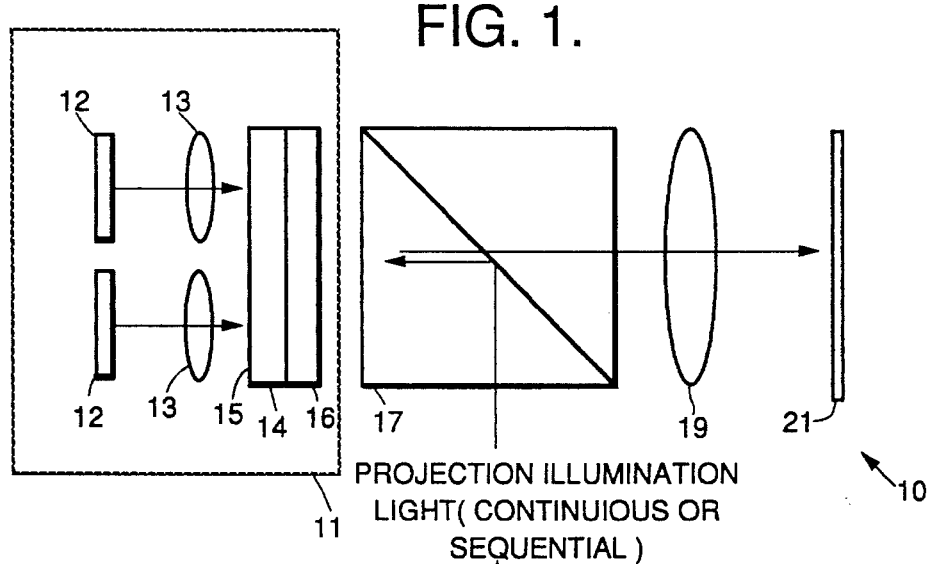
FIG. 1 illustrates a first embodiment of a high resolution projection display system in accordance with the principles of the present invention.

Referring to the drawing figures, FIG. 1 illustrates a first embodiment of projection apparatus 10 comprising a high resolution image projection display system 10 in accordance with the principles of the present invention. The high resolution projection display system 10 comprises an image source 11 that includes a plurality of tiled or mosaic-like image displays 12 that are disposed in an object space of the display system. Each of the plurality of tiled image displays 12 may be comprised of flat panel displays, or active matrix light valves, for example. In this first embodiment, relay optics 13, comprising a plurality of relay lenses 13 are disposed along the respective optical paths of images projected by the image displays 12. A photoactivated reflective liquid crystal light valve 14 is disposed along the optical paths of the respective images relayed by the relay optics 13. Images projected by the image displays 12 are imaged onto an input surface 15 of the photoactivated reflective liquid crystal light valve 14.

A polarizing beamsplitter 17, or polarizing beamsplitter prism 17, is disposed adjacent an output surface of the image source 11, at the output of the photoactivated reflective liquid crystal light valve 14. Projection illumination light is provided by an illumination source 18 and is projected by way of the polarizing beamsplitter prism 17 onto an output surface 16 of the photoactivated reflective liquid crystal light valve 14. The illumination light is reflected from the output surface 16 of the photoactivated reflective liquid crystal light valve 14 back through the polarizing beamsplitter prism 17 and is imaged using a projection lens 19 onto a display screen 21 located in image space. The projection light produced by the illumination source 18 may be continuous or sequentially imaged monochrome or red-green-blue (RGB) light.

Figure 2:
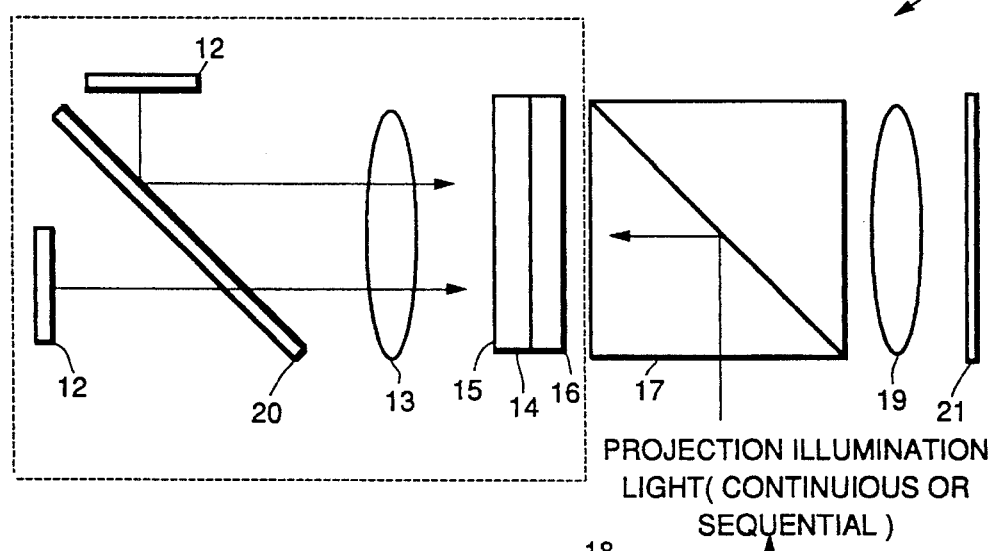
FIG. 2 illustrates a second embodiment of a high resolution projection display system in accordance with the principles of the present invention.

FIG. 2 illustrates a second embodiment of the high resolution projection display system 10 in accordance with the principles of the present invention. The high resolution projection display system 10 comprises an image source 11 that includes a plurality of tiled or mosaic-like image displays 12. As in the first embodiment, each of the plurality of image displays 12 may be comprised of flat panel displays, or active matrix light valves, for example. A beamsplitter 20 comprising a thin plate 20 or pellicle is disposed in the optical paths of the respective images projected by the image displays 12. The relay optics 13 comprises a single relay lens 13 disposed along the optical paths of images projected by the image displays 12 through the beamsplitter 20. A photoactivated reflective liquid crystal light valve 14 is disposed in the optical paths of the respective images relayed by the relay optics 13. The images projected by the image displays 12 are imaged onto an input surface 15 of the photoactivated reflective liquid crystal light valve 14.

The polarizing beamsplitter prism 17 is disposed adjacent an output surface of the image source 11, at the output of the photoactivated reflective liquid crystal light valve 14. Projection illumination light is provided by the illumination source 18 and is projected by way of the polarizing beamsplitter prism 17 onto the output surface 16 of the photoactivated reflective liquid crystal light valve 14. The illumination light is reflected from the output surface 16 of the photoactivated reflective liquid crystal light valve 14 back through the polarizing beamsplitter prism 17 and is imaged using the projection lens 19 onto the display screen 21. The projection light provided by the illumination source 18 may be continuous or sequentially imaged monochrome or red-green-blue (RGB) light.

Figure 3:
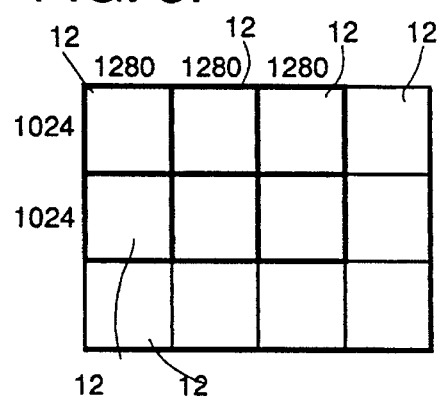
FIG. 3 illustrates one tiling scheme that may be employed in the systems of FIGS. 1 and 2.
Figure 4:
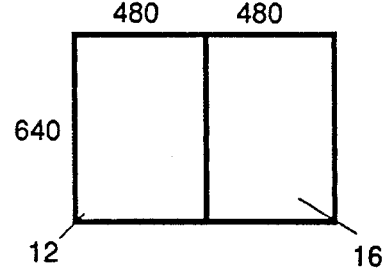
FIG. 4 illustrates a tiled projection display for use in the systems of FIGS. 1 and 2.

FIG. 3 illustrates a tiling scheme that may be employed in the systems of FIGS. 1 and 2, while FIG. 4 illustrates a tiled image source 11 that may be used in the systems of FIGS. 1 and 2. FIG. 4 shows two 480 by 640 flat panel displays tiled horizontally to form a 640 by 960 pixel image. The displays may also be tiled vertically if desired. FIG. 3 shows tiling of six 1024 by 1280 displays (shown in solid lines) to form a 2048 by 3840 pixel display and six additional displays (shown in dashed lines) providing for twelve total displays that create a 4096 by 5120 pixel display. High quality matrix displays having on the order of 1024×1280 pixels are currently under development and will be available in the very near future. FIG. 3 illustrates how these panels are tiled together to form a 2048×3840, (or more), pixel image.

The present invention thus incorporates the principle of optical tiling or mosaicking images provided by active matrix light valves or other flat panel displays onto a photoconductive surface of the photoactivated reflective liquid crystal light valve 14. The images provided by the image displays 12 serve as the object for the photoactivated reflective liquid crystal light valve 14. The light valve 14 modulates the incident high intensity projection illumination light permitting projection of the high resolution image onto the display screen 21. By optically tiling constituent portions of the complete final image onto the photoactivated reflective liquid crystal light valve 14, any demarcation or artifact occurring at the seams, or tile boundaries of the images produced by the tiled or mosaic-like image displays 12, are made to effectively disappear. More particularly, when the image tiles are aligned so that the seams therebetween are a small fraction of a pixel, the photoactivated reflective liquid crystal light valve 14, to a high degree, spatially low pass filters the tiled image, thereby eliminating the seams, and minimizing any tiling artifacts in observation (image) space.

There are several available ways to accomplish the optical tiling function. The embodiment illustrated in FIG. 2 shows a breadboard configuration that uses the partially reflecting and transmitting beamsplitter plate 20, which may take the form of a thin glass or quartz plate 20, or a pellicle. The use of a pellicle eliminates potential detrimental aberration effects, such as coma and astigmatism resulting from a tilted beamsplitter plate 20 disposed in the image path. Alternatively, a beamsplitter cube 20 may be employed in place of the beamsplitter plate 20. The use of the beamsplitter cube minimizes the above-described detrimental aberrations, and additional aberrations may be minimized or eliminated (i.e., corrected for) by the relay lens 13 or lenses 13 comprising the relay optics 13.

There are other types of beamsplitters 20 that may be used to combine multiple images from the tiled image displays 12. These beamsplitters 20 may be made to work with more than two image displays 12. However, the more displays, the more complex and unwieldy the system becomes. A very direct approach is to incorporate multiple relay lenses 13, one for each panel, in the manner shown in FIG. 1. In the embodiment of FIG. 1, the image forming light derived from the image displays 12 passes through the lenses 13 in an off-axis manner and is then registered at the input surface 15 of the photoactivated reflective liquid crystal light valve 14. Although it is possible to use an off-axis relay configuration, this potentially leads to detrimental keystone distortion at the photoactivated reflective liquid crystal light valve 14, resulting from "pointing" of the relay lenses 13 at the photoconductor of the light valve 14.

The image displays 12 (active matrix light valve or flat panel) may be transmissive or reflective, while the photoactivated reflective liquid crystal light valve 14 may have one of several different photoconductors, including amorphous silicon (aSi), cadmium sulfide (CdS), or cadmium selenide (CdSe), for example. The image displays 12 do not have to be active matrix light valves. Another physically small, high resolution display, such as is provided by a laser scanning projector, for example, may be employed as the image displays 12.

A breadboard model of the display system, developed in a laboratory, has been assembled and tested, and demonstrates the principles of the present invention and capabilities of the present high resolution image projection display system. The breadboard model of the display system 10 utilizes 640×480 pixel transmissive flat panel displays (active matrix light valves) and a beamsplitter plate 20 that are used to transmit images that are written onto the photoconductive input surface 15 of the photoactivated reflective liquid crystal light valve 14. The photoactivated reflective liquid crystal light valve 14 is an aSi (amorphous silicon) light valve manufactured by the assignee of the present invention. The illumination source 18 is a 1 Kw xenon arc lamp. Other light sources that may e employed include metal halide and halogen light sources, and the like. The breadboard model of the display system 10 projected a monochrome (single color) image. Color is implemented by adding two more channels.

Qualitative evidence and observation showed that the boundary between the image tiles of the projected image effectively disappeared at a normal viewing distance, and was very difficult to discern when viewed within a few inches of the display screen 21. Several different patterns were viewed including a horizontal and vertical alternating four line segment pattern and a multiple diamond pattern to show the effects of diagonal lines at the image tile boundaries. Patterns were projected using both light and dark backgrounds.

Figure 5:
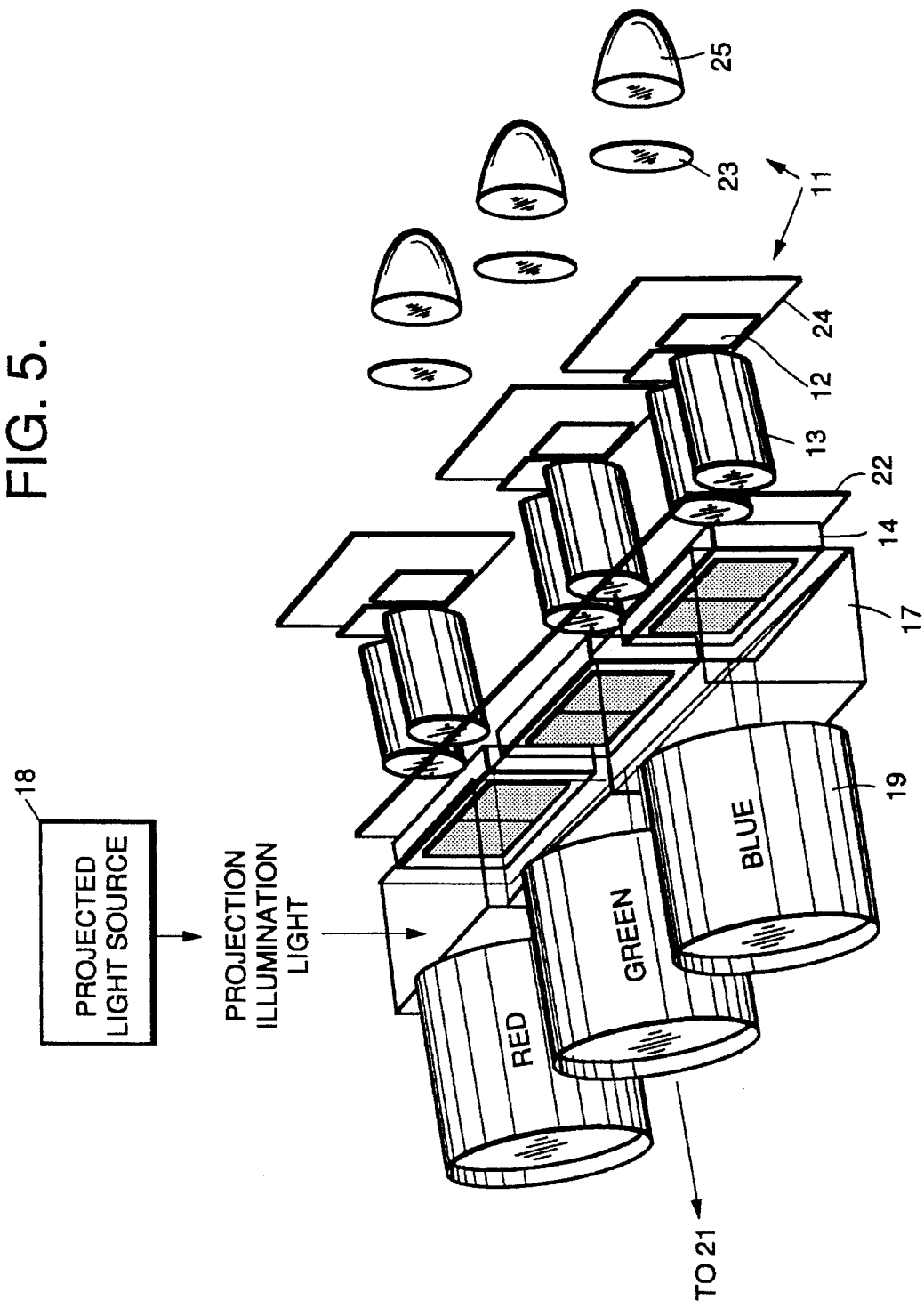
FIGS. 5 and 6 illustrate exploded views of two embodiments of super high resolution projection displays in accordance with the present invention.
Figure 6:
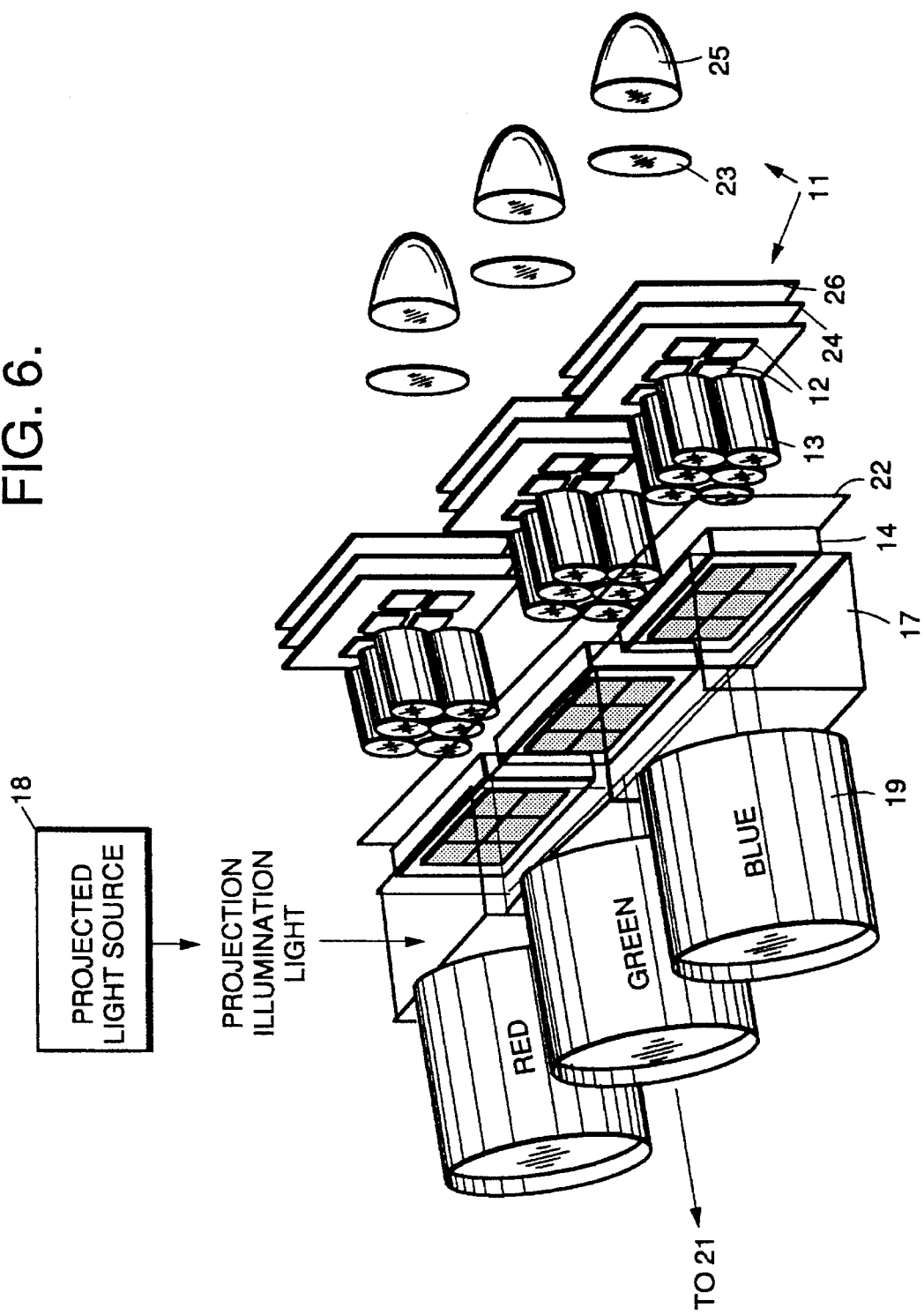

For the purposes of completeness, FIGS. 5 and 6 illustrate exploded views of two embodiments of high resolution image projection display systems 10 in accordance with the present invention. Both systems 10 comprise three-color projectors that are suitable for providing high resolution large format projected images that are essentially seamless when observed by viewers. The systems 10 comprise substantially the same components as have been described with reference to FIGS. 1 and 2. However, in addition, the systems 10 include analyzers 22 disposed between the relay lenses 13 and the input surfaces of the light valves 14, writing illumination sources 25 and condensing lenses 23 that form part of the image source 11, and an input polarizer 24 disposed between the condensing lenses 23 and the light valves 14. The system 10 of FIG. 6 further comprises input bandpass or edge filters 26 disposed between the condensing lenses 23 and the input polarizers 24.

Thus there has been described new and improved image display systems for displaying relatively large high resolution images that use small tiled or mosaic-like displays. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. Projection apparatus for projecting a relatively large high resolution image on a display screen, said apparatus comprising:

an image source comprising a plurality of tiled image displays, said tiled image displays disposed in an object space of said apparatus;

relay optics disposed along optical paths of images projected by the respective tiled image displays;

a photoactivated reflective liquid crystal light valve disposed along the optical paths of the respective images relayed by the relay optics for receiving the images projected by the tiled image displays imaged onto an input surface thereof;

a polarizing beamsplitter disposed adjacent an output surface of the photoactivated reflective liquid crystal light valve;

an illumination source disposed adjacent the polarizing beamsplitter for providing illumination light that is projected by way of the polarizing beamsplitter onto the output surface of the photoactivated reflective liquid crystal light valve and which is reflected from the output surface back through the polarizing beamsplitter; and a projection lens disposed adjacent an output surface of the polarizing beamsplitter for projecting the projection illumination light onto the display screen.

2. The apparatus of claim 1 wherein each of the plurality of tiled image displays comprise flat panel displays.

3. The apparatus of claim 1 wherein each of the plurality of tiled image displays comprise active matrix light valves.

4. The apparatus of claim 1 wherein the relay optics comprises a plurality of relay lenses.

5. The apparatus of claim 1 wherein the relay optics comprises a single relay lens.

6. The apparatus of claim 1 wherein the illumination source continuously projects monochrome projection light.

7. The apparatus of claim 1 wherein the illumination source sequentially projects monochrome projection light.

8. The apparatus of claim 1 wherein the illumination source continuously projects red-green-blue (RGB) projection light.

9. The apparatus of claim 1 wherein the illumination source sequentially projects red-green-blue (RGB) projection light.

10. The apparatus of claim 1 further comprising a beamsplitter disposed between the plurality of tiled image displays and the relay optics.

11. The apparatus of claim 10 wherein the beamsplitter comprises a partially reflecting and transmitting beamsplitter plate.

12. The apparatus of claim 10 wherein the beamsplitter comprises a thin glass plate.

13. The apparatus of claim 10 wherein the beamsplitter comprises a thin quartz plate.

14. The apparatus of claim 10 wherein the beamsplitter comprises a pellicle.

15. The apparatus of claim 10 wherein the beamsplitter comprises a beamsplitter cube.

16. Projection apparatus for projecting a relatively large high resolution image on a display screen, said apparatus comprising:

an image source comprising a plurality of tiled image displays, said tiled image displays disposed in an object space of said apparatus;

relay optics disposed along optical paths of images projected by the respective tiled image displays;

a photoactivated reflective liquid crystal light valve disposed along the optical paths of the respective images relayed by the relay optics for receiving the images projected by the tiled image displays imaged onto an input surface thereof;

a polarizing beamsplitter disposed adjacent an output surface of the photoactivated reflective liquid crystal light valve;

a beamsplitter disposed between the plurality of tiled image displays and the relay optics:

an illumination source disposed adjacent the polarizing beamsplitter for providing illumination light that is projected by way of the polarizing beamsplitter onto the output surface of the photoactivated reflective liquid crystal light valve and which is reflected from the output surface back through the polarizing beamsplitter; and a projection lens disposed adjacent an output surface of the polarizing beamsplitter for projecting the projection illumination light onto the display screen.

17. The apparatus of claim 16 wherein each of the plurality of tiled image displays comprise flat panel displays.

18. The apparatus of claim 16 wherein each of the plurality of tiled image displays comprise active matrix light valves.

19. The apparatus of claim 16 wherein the relay optics comprises a plurality of relay lenses.

20. The apparatus of claim 16 wherein the relay optics comprises a single relay lens.

21. The apparatus of claim 16 wherein the illumination source continuously projects monochrome projection light.

22. The apparatus of claim 16 wherein the illumination source sequentially projects monochrome projection light.

23. The apparatus of claim 21 wherein the illumination source continuously projects red-green-blue (RGB) projection light.

24. The apparatus of claim 22 wherein the illumination source sequentially projects red-green-blue (RGB) projection light.

25. The apparatus of claim 16 wherein the polarizing beamsplitter comprises a partially reflecting and transmitting beamsplitter plate.

26. The apparatus of claim 25 wherein the beamsplitter comprises a thin glass plate.

27. The apparatus of claim 25 wherein the beamsplitter comprises a thin quartz plate.

28. The apparatus of claim 25 wherein the beamsplitter comprises a pellicle.

29. The apparatus of claim 25 wherein the beamsplitter comprises a beamsplitter cube.

\* \* \* \* \*